Patented Apr. 27, 1926.

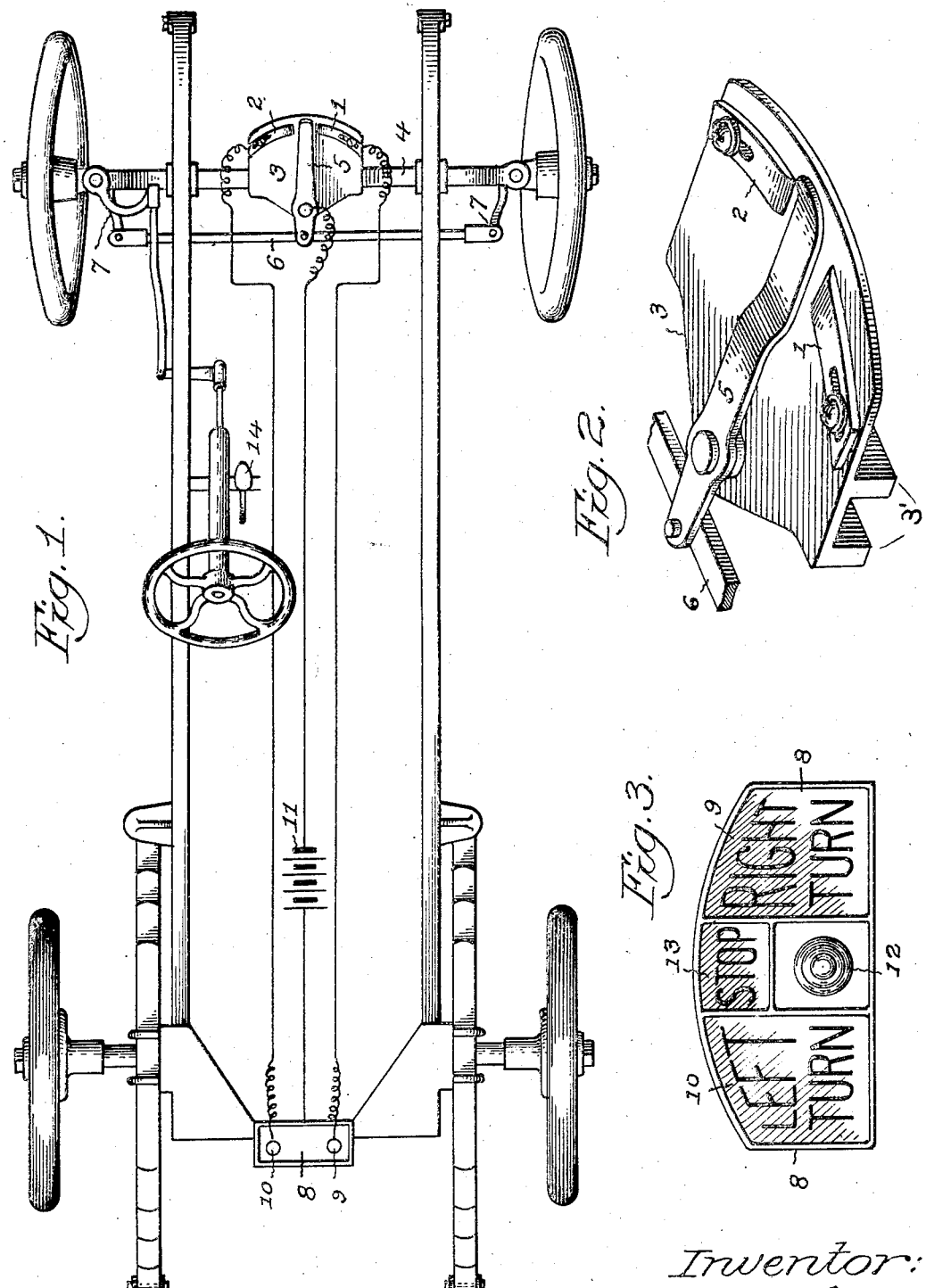

1,582,069

UNITED STATES PATENT OFFICE.

SOLINO F. NANNA, OF CHICAGO, ILLINOIS.

CIRCUIT-CLOSING MECHANISM FOR DIRECTION SIGNALS.

Application filed October 12, 1923. Serial No. 668,057.

*To all whom it may concern:*

Be it known that I, SOLINO F. NANNA, a citizen of the United States of America, and a resident of Chicago, in the county of Cook and State of Illinois, have invented a certain new and useful Improvement in Circuit-Closing Mechanism for Direction Signals, of which the following is a specification.

This invention relates to that class of direction signals for automobiles in which the movements of the steering wheels are adapted to automatically operate the "to the right" and the "to the left" light signals at the rear end of the vehicle, and the present improvement has for its object.

To provide a structural formation and association of parts, wherein the connecting rod of the steering knuckles of the front or steering wheels has operative connection with the movable member or lever of electric switch, which in turn is operatively connected to the light signals at the rear of the vehicle, to operate the same in an accurate and certain manner, all as will hereinafter more fully appear.

In the accompanying drawing:—

Fig. 1, is a plan view of a motor vehicle chassis having the present invention applied.

Fig. 2, is an enlarged detail perspective view of the electric switch and accessory parts.

Fig. 3, is a rear elevation of the signal lantern, which is arranged in any usual manner at the rear of the vehicle.

Like reference numerals indicate like parts in the different views.

In this invention the stationary contact plates or members 1 and 2 of the electric switch are fixed upon a supporting base plate 3 primarily secured by any usual means to the front axle 4 of the vehicle, with its forward portion projecting in front of the axle. On such forward portion of the base plate 3 a pair of opposed stationary contact plates 1 and 2 are mounted, preferably in an adjustable manner to and from each other as illustrated in Fig. 2. A material feature of the present improvement involves the provision on the under side of the base plate 3, of a pair of spaced ribs 3' extending the length of said plate and adapted to straddle and engage the axle 4 to provide an auxiliary attaching means for effectively holding the base plate 3 from a turning movement upon the axle under the stress and strains of continued practical use.

The movable contact member or lever 5 of the switch is pivoted intermediate its length to a rearward extension of the base plate 3 aforesaid, with its forward and longer end adapted for electrical contact with one or the other of the stationary contact plates 1 and 2 aforesaid. The other end of the lever 5 is operatively connected to the transverse connecting rod 6 of the steering knuckles 7 of the front wheels of the vehicle chassis.

With the above described arrangement of parts, as the steering wheels are operated for a right or for a left turn, the forward end of the contact lever 5 will move to contact with one or the other of the stationary contact plates 1 or 2, to close the circuit of one or the other of a pair of signal lights arranged as follows:—

A signal lantern casing 8 is mounted as usual at the rear end of the vehicle chassis, and is provided with a pair of side electric lights individual to and adapted to illuminate "Right turn" and "Left turn" legends 9 and 10 on the side portions of the rear face of the lantern casing 8 as illustrated in Fig. 3.

Each of said electric lights will have its individual circuit and will include the battery 11 or other source of electro-motive force, the movable switch lever 5, and one or the other of the stationary contact plates 1 or 2 aforesaid.

With a view to supply a complete rear signal system for automobiles, the signal lantern 8 is preferably provided with a manually controlled red light signal 12 arranged centrally between the right turn and left turn signals 9 and 10, of the present improvement, and with a stop light signal 13, similarly arranged and adapted for operation and control by the brake lever 14 of the vehicle chassis.

Having thus fully described my invention, which I claim as new and desire to secure by Letters Patent, is:—

In a circuit closing mechanism for the direction signals of motor vehicles, the combination of a base plate having on its under surface a pair of spaced ribs adapted to straddle and fixedly engage the front axle of a vehicle and provided with a forward and rear extension, a pair of contact plates of a segmental form adjustably secured in spaced relation to said forward extension, and a movable contact lever pivoted to the aforesaid rear extension with one end arranged for operative contact with said contact plates and the other end provided with means for pivotal connection with the transverse connection rod of the steering knuckles of a vehicle.

Signed at Chicago, Illinois, this 8th day of October, 1923.

SOLINO F. NANNA.